L. G. KNIFFEN.
Harvester.

No. 67,884. Patented Aug. 20, 1867.

Inventor:

UNITED STATES PATENT OFFICE.

L. G. KNIFFEN, OF WORCESTER, MASSACHUSETTS.

IMPROVEMENT IN HARVESTERS.

Specification forming part of Letters Patent No. 67,884, dated August 20, 1867.

*To all whom it may concern:*

Be it known that I, L. G. KNIFFEN, of the city and county of Worcester, and State of Massachusetts, have invented certain new and useful Improvements in Harvesters, of which the following is a full, clear, and exact description, reference being had to the accompanying drawings, which make part of this specification, and in which—

Figure 1:
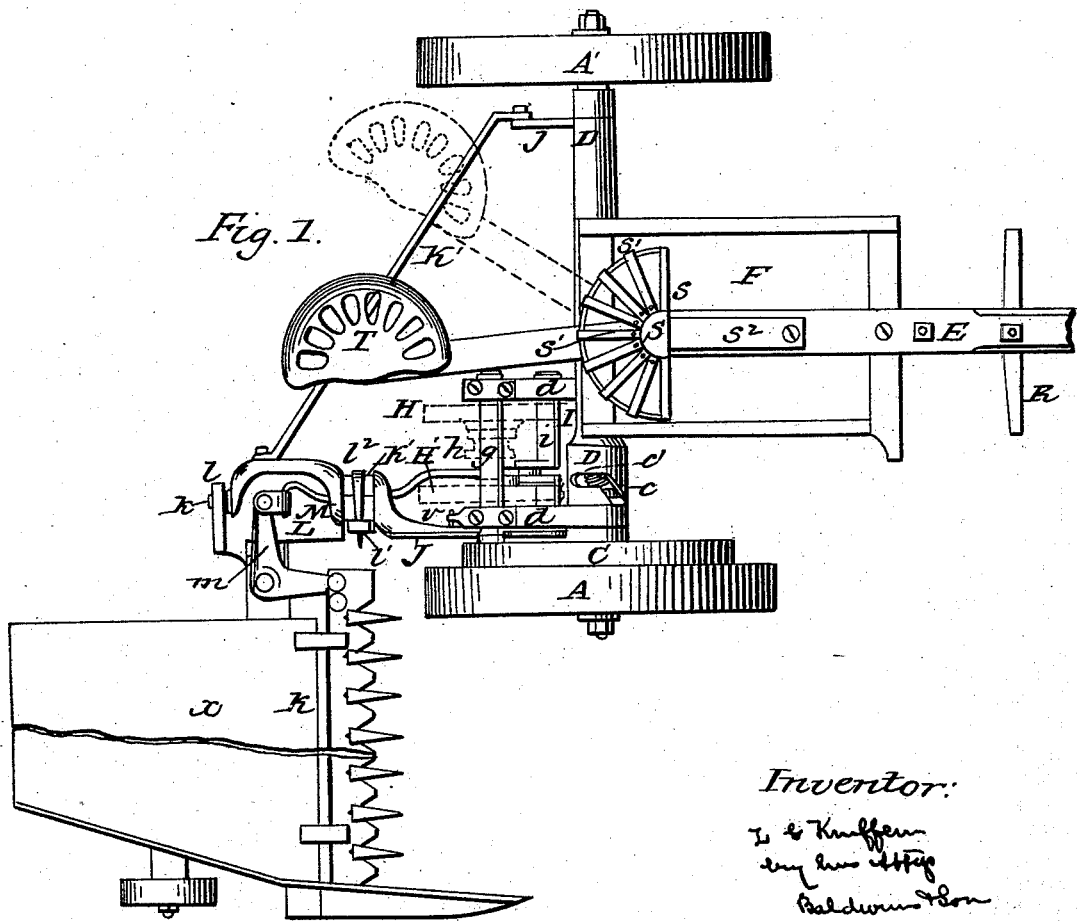
Figure 2:
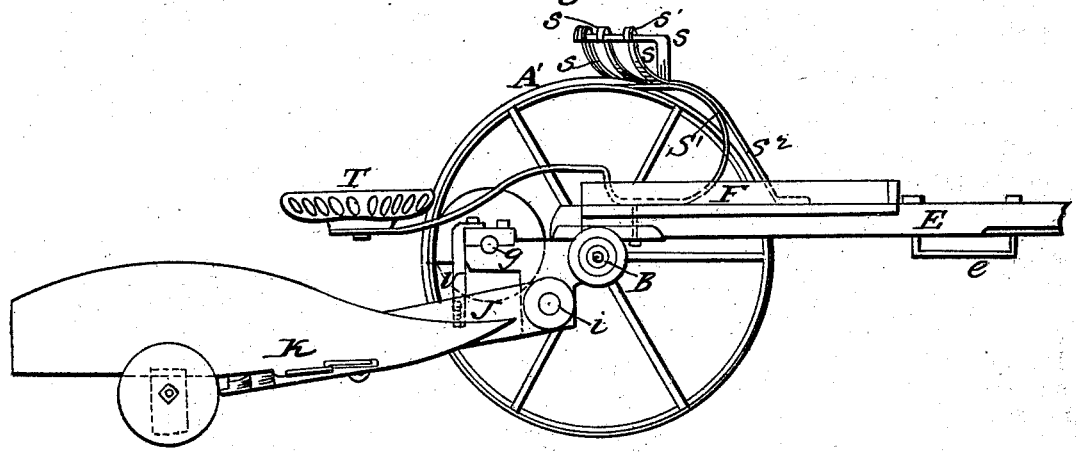

Figure 1 represents a plan or top view of a harvester embracing my improvements, and Fig. 2 a view, in elevation, of the same.

The improvements herein claimed consist, first, in a novel mode of arranging a swinging raker's seat on a two-wheeled hinge-jointed harvester; second, in a novel mode of connecting the main frame and platform; third, in a yielding spring-seat for the driver or raker, or for both.

In the accompanying drawings, which exemplify one convenient mode of carrying out my invention, two driving and supporting wheels, A A′, are shown as turning loosely on the main axle B, to which suitable backing-ratchets are firmly secured, so as to turn with the axle.

A tongue, E, is attached to the bed-piece, and supports a frame, F, which carries the lifting devices and driver's and raker's seats.

The main gear-wheel C drives a corresponding spur-pinion on a counter-shaft, $g$, mounted in brackets $d$ projecting from the bed-piece D, and carrying two spur-wheels H H′. These wheels are mounted loosely on the counter-shaft, and can be alternately thrown into or out of gear by a sliding clutch and feather operated by a hand-lever. They gear into corresponding pinions I I′ on the crank-shaft $i$, mounted in the same brackets, so as to rotate parallel to the main axle.

The wheel H is of a diameter greater than its fellow, while the corresponding pinion I is of less diameter than its fellow, so that by changing from one set to the other the speed of the cutters can be increased or diminished at pleasure, to adapt the machine to the change from a reaper to a mower or vice versa.

A coupling-arm, J, is pivoted to the bracket $d$ in line with the crank-shaft $i$, and is curved in the peculiar form shown in the drawings.

The coupling-arm is braced by a diagonal lever, K′, pivoted to a down-hanger, $j$, secured to the bed-piece D.

The finger-beam K is pivoted to the coupling-arm by means of a shoe, L, formed of the peculiar shape shown in the drawings, and having a loop, $l$, to fit on a corresponding stud, $k$, on the coupling-arm, and a yoke or fork, $l^1$, to encircle the tubular part $k'$ of the coupling-arm, through which the pitman M passes. The fork is clasped upon the coupling-arm by a bow-spring, $l^2$, which slips into loops on the yoke, and is held by square shoulders on its ends. By this means the finger-beam and coupling-arm are firmly connected, so as to resist lateral strains, while the finger-beam is free to swing round the coupling-arm, to allow either end to rise or fall to conform to the undulations of the ground.

The cutters are vibrated by means of a bell-crank or elbow-lever, $m$, pivoted to play horizontally on the shoe L, and driven by the pitman M.

The driver's seat S consists of a frame, $s$, to which a series of radial ribs or springs, $s^1$, is secured. These springs are curved over the back of the seat, as shown in the drawings. By this means each spring is independent, and yields as the strain is thrown upon it, thus preventing shocks and jars to the driver.

In order to secure a seat capable of yielding vertically, and yet prevent too great a backward and forward movement, I mount it on a U-shaped spring, S′, having its open end to the rear, and stiffen it by an S-shaped spring, $s^2$, the upper end of which conforms to the shape of the supporting-spring, in order to stiffen it, while its lower end extends forward and is braced to the frame. By this mode of connection pressure is exerted longitudinally instead of transversely to the spring, and greater stiffness is attained.

The raker rides upon a seat, T, projecting behind the axle, and so pivoted as to swing horizontally in the arc of a circle toward and from the platform X, as shown in red in Fig. 1. The raker rides with his feet upon the coupling-arm and brace-bar, and draws the grain off with a rake, his side being toward the driver. The divider side of the platform is sustained by the usual grain-wheel, while the gearing side is upheld by a spring-catch, V, on the frame, which takes into a suitable detent or pin on the coupling-arm, both wheel and detent being capable of adjustment so as to set the platform at any required elevation.

What I claim as my invention, and desire to secure by Letters Patent, is—

1. The arrangement, as described, in a two-wheeled hinged-jointed harvester, of the swinging raker's seat with respect to the tubular main frame, driving-wheels, and reversible coupling-arm, as set forth.

2. The combination of the main frame and coupling-arm with the adjusting spring-catch V, as and for the purpose described.

3. The driver's or raker's seat, constructed of independent springs, as described.

In testimony whereof I have hereunto subscribed my name.

L. G. KNIFFEN.

Witnesses:
 GEO. A. KIMBALL,
 WM. S. BICKFORD.